United States Patent [19]

Lusk

[11] 3,800,064
[45] Mar. 26, 1974

[54] UNIVERSAL POWER CABLE JOINT WITH CLOSED-CELL SPONGE STRESS RELIEF ELEMENT

[75] Inventor: George E. Lusk, Downers Grove, Ill.

[73] Assignee: G&W Electric Specialty Company, Blue Island, Ill.

[22] Filed: Sept. 28, 1972

[21] Appl. No.: 292,903

[52] U.S. Cl............ 174/73 R, 174/11 BH, 174/71 R, 174/142
[51] Int. Cl................... H02g 15/02, H01b 17/26
[58] Field of Search......... 174/11 BH, 18, 19, 71 R, 174/73 R, 73 SC, 78, 142; 339/136 R, 143 R, 143 C

[56] References Cited
UNITED STATES PATENTS

| | | | |
|---|---|---|---|
| 2,408,990 | 10/1946 | Mitchell | 174/142 UX |
| 2,953,628 | 9/1960 | Winter et al. | 174/142 |
| 3,055,968 | 9/1962 | Spiece | 174/142 UX |
| 3,290,428 | 12/1966 | Yonkers | 174/73 R |
| 3,597,527 | 8/1971 | Lusk | 174/73 R |
| 3,634,604 | 1/1972 | Lusk | 174/73 R |

Primary Examiner—Laramie E. Askin
Attorney, Agent, or Firm—Fitch, Even, Tabin & Luedeka

[57] ABSTRACT

A cable joining device of modular concept includes a tubular housing for receiving a prepared end of a power cable which has a region of high electrical stress, and a stress relief element for interposition between the housing and the cable. The stress relief element includes a compressible portion having electrically conductive properties and forming a stress control shield, a high dielectric strength portion contiguous to the shield portion, and a third portion that is compressible, has electrically conductive properties and is contiguous to the high dielectric strength portion. The interposition of the stress relief element causes it to be under radial compressive stress, which creates a continuous compliance of the element to the cable. The relation of the portions to one another is such that the high dielectric strength portion surrounds the region of high electrical stress of the cable. The tubular housing includes a provision for an accessible voltage test point.

25 Claims, 21 Drawing Figures

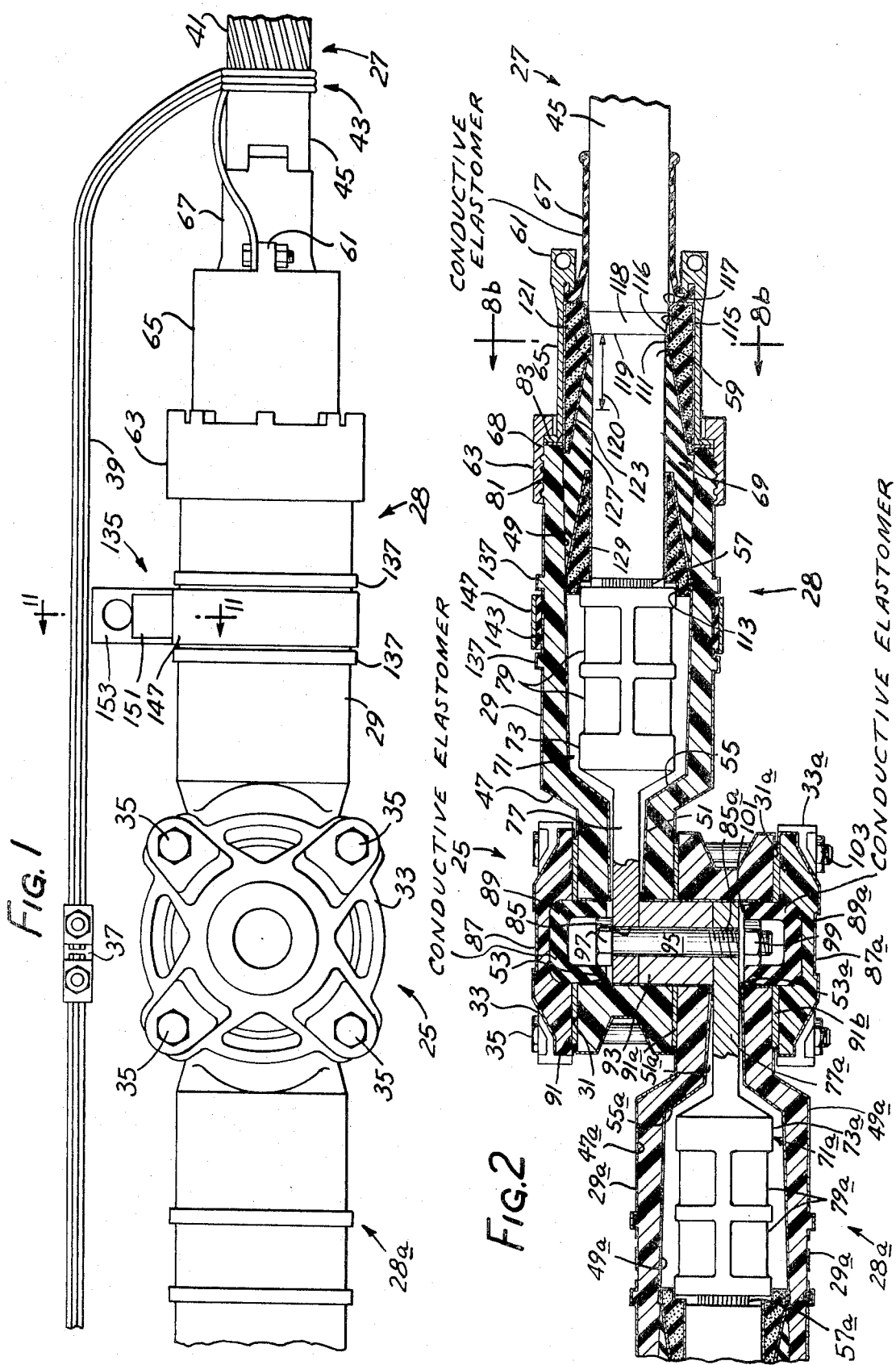

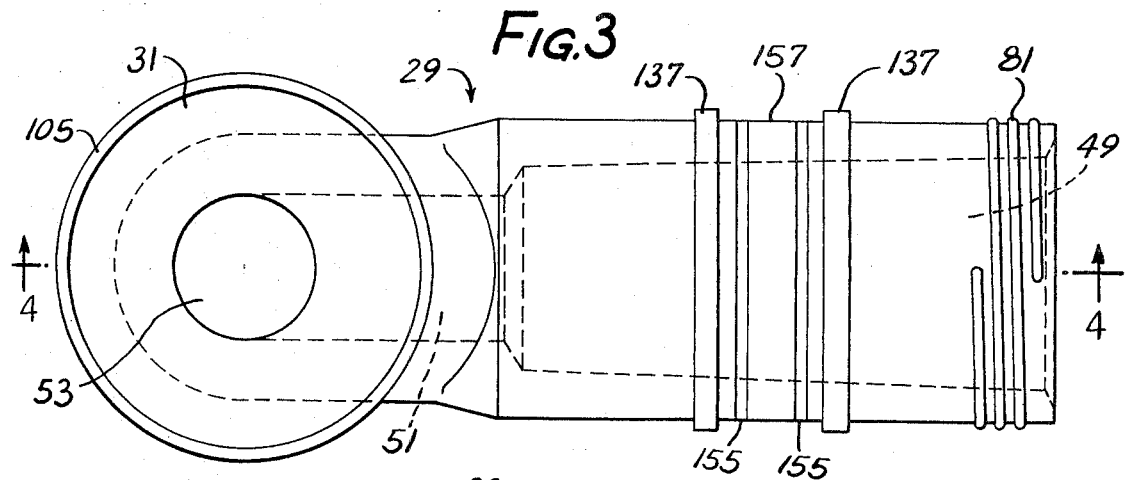
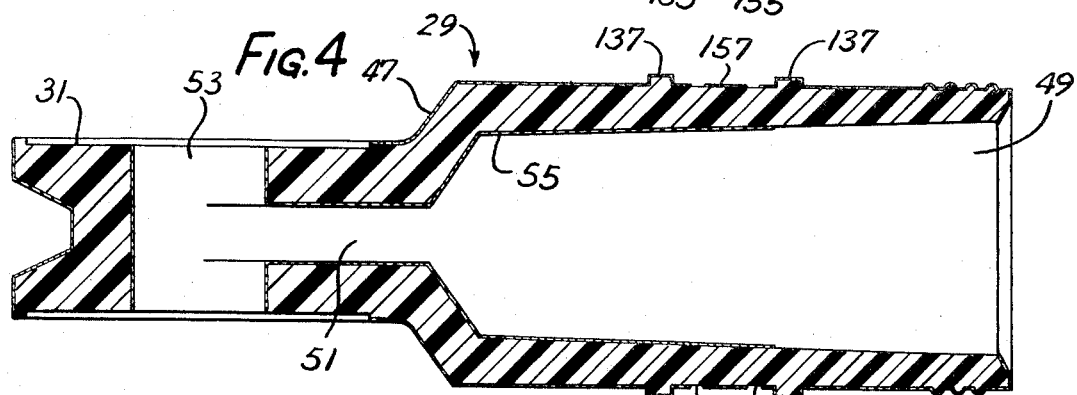
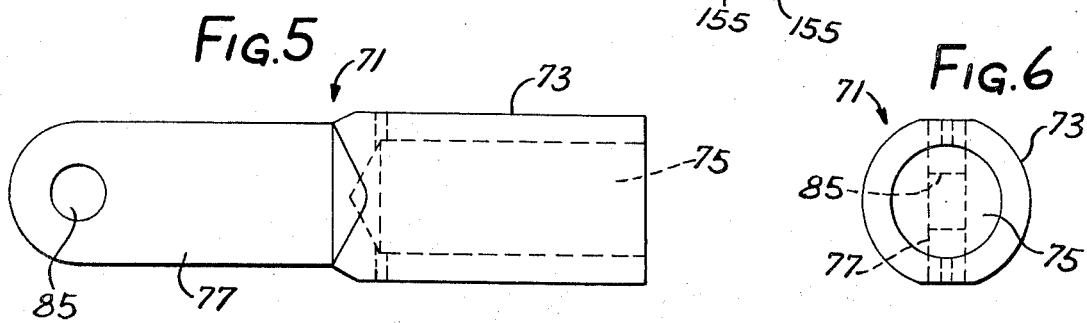
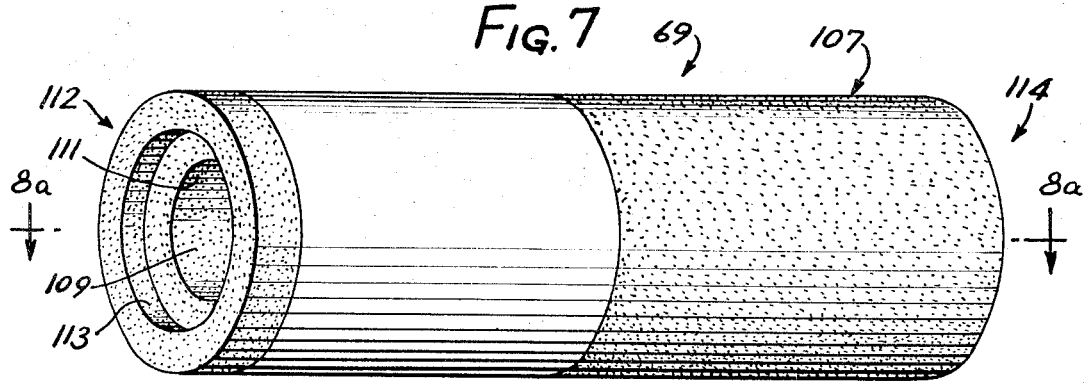

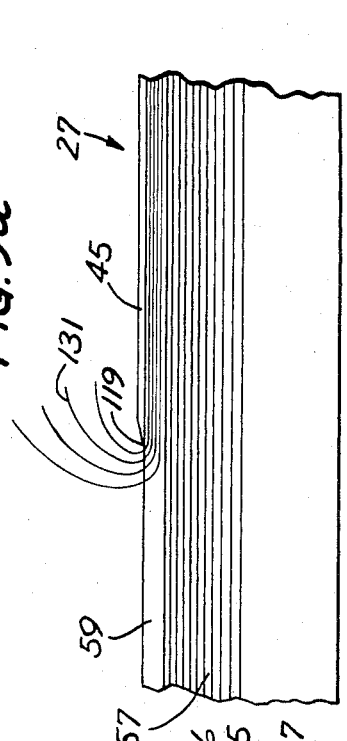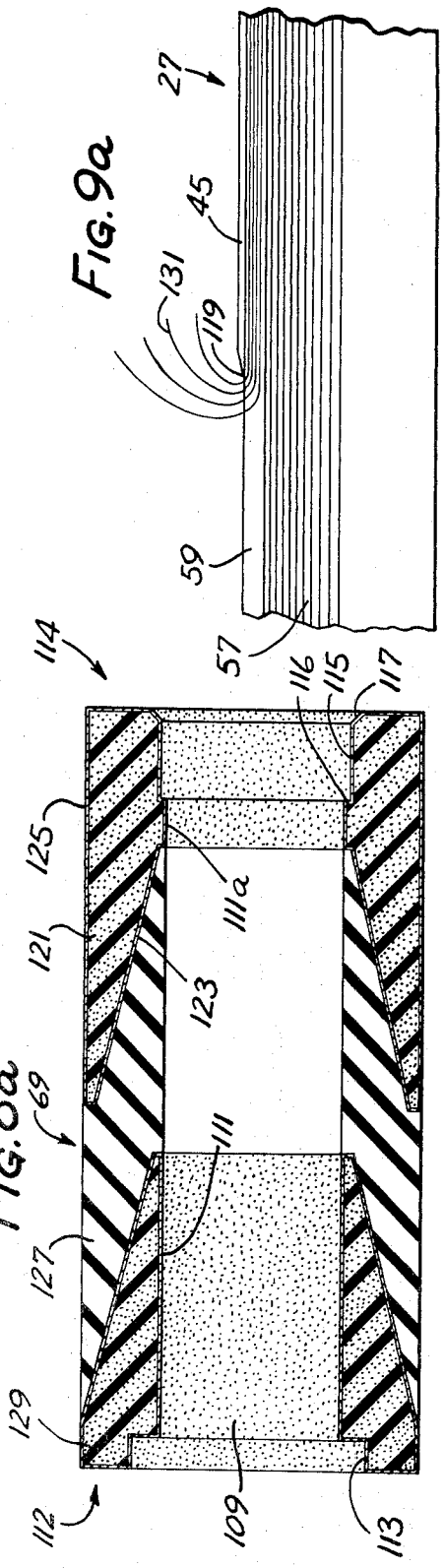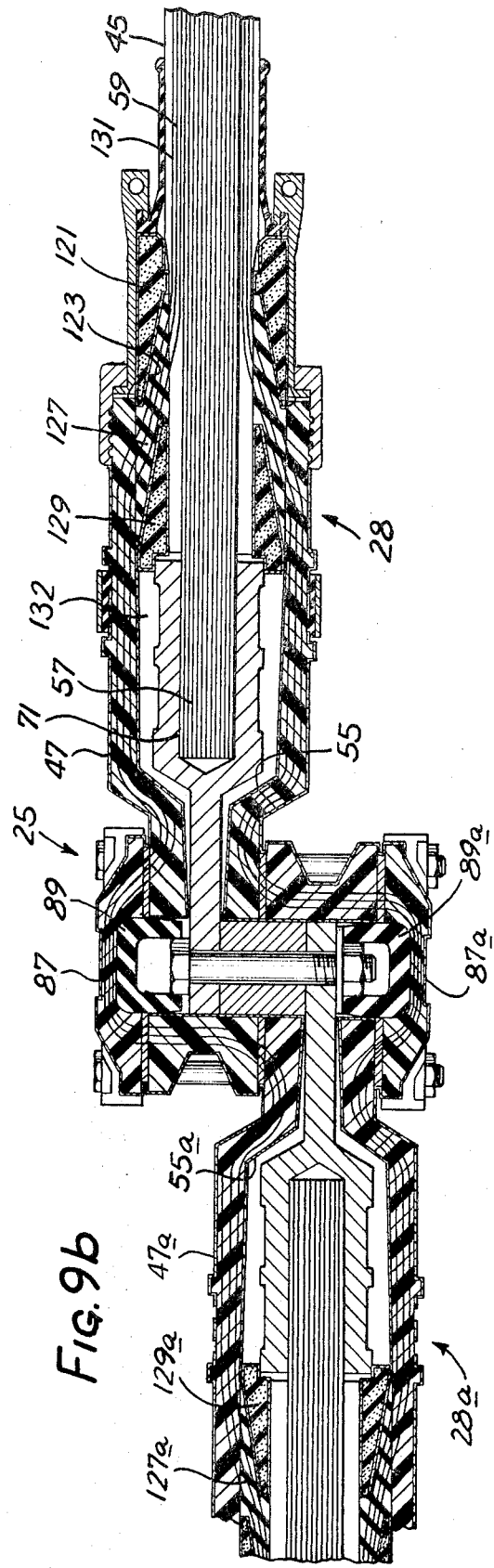

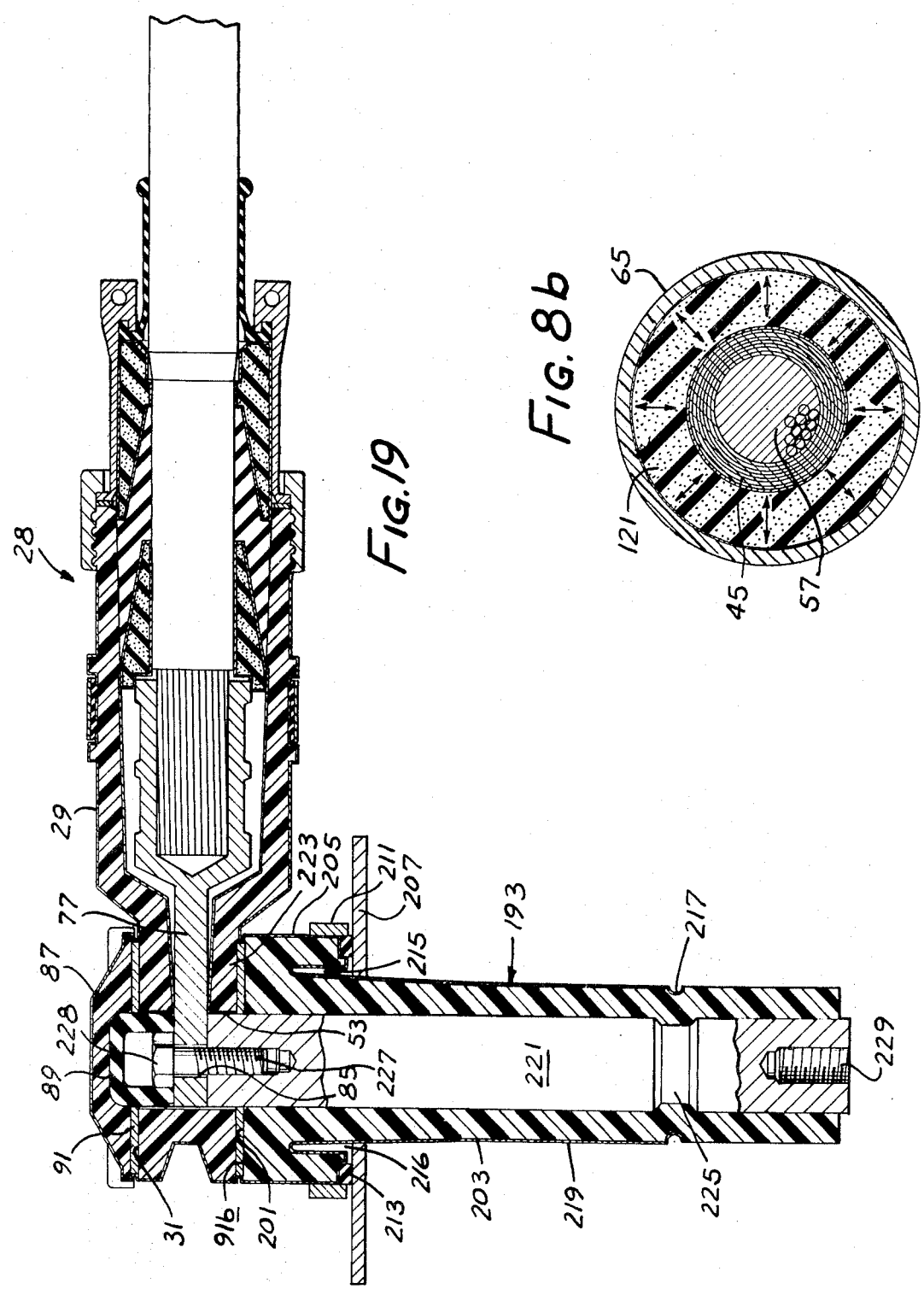

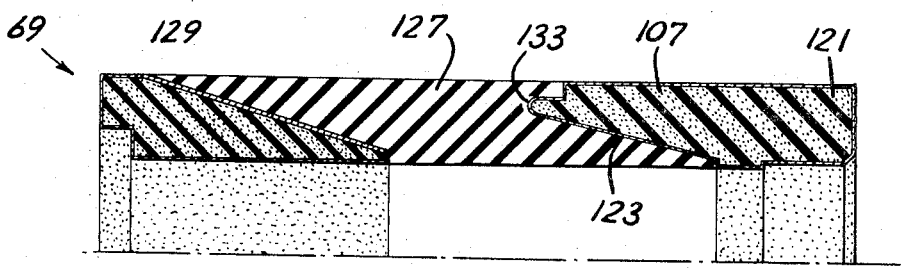
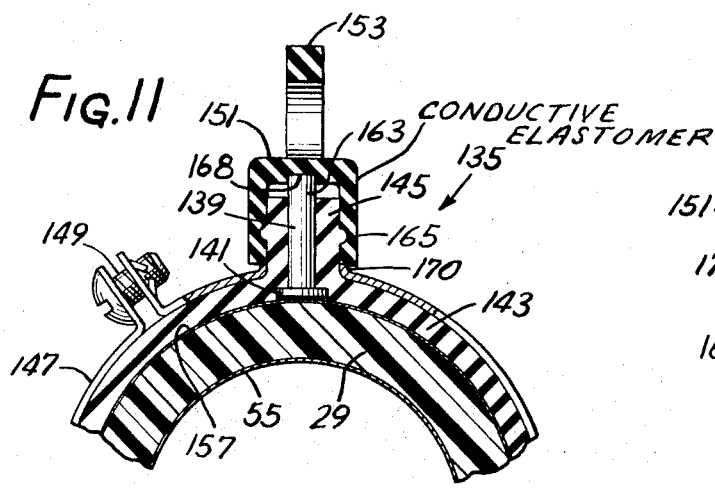
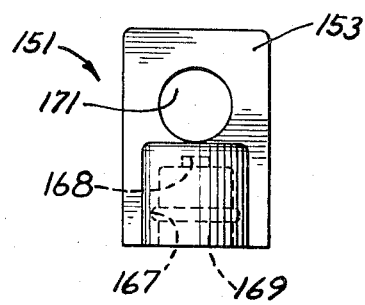
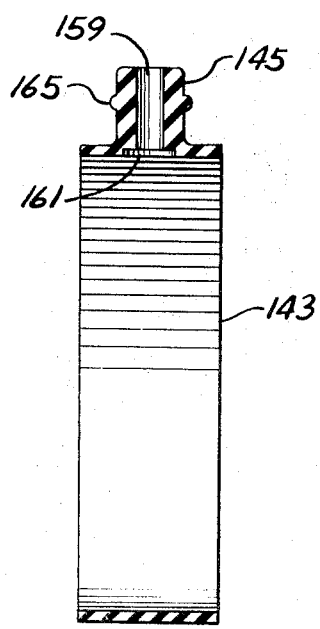
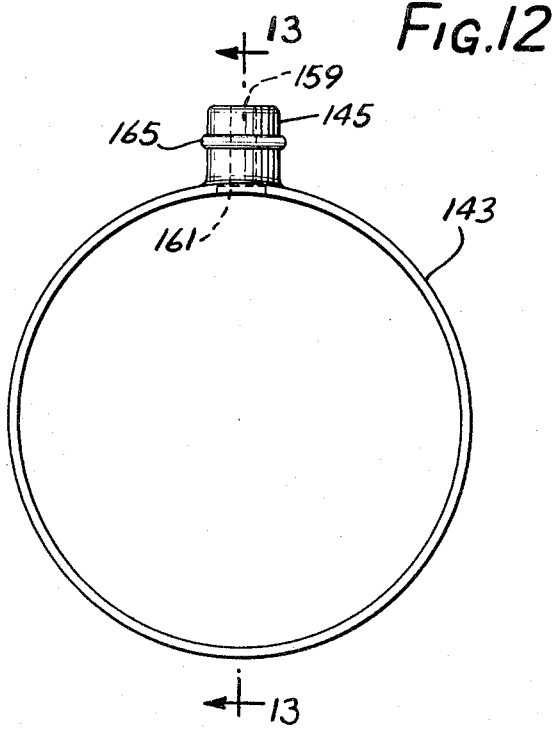

UNIVERSAL POWER CABLE JOINT WITH CLOSED-CELL SPONGE STRESS RELIEF ELEMENT

The present invention relates generally to power cables, and more particularly to improvements in a power cable joint or splice and a stress control element used therein.

The improved joint is substantially universal in that it may be aplied to almost all types of solid plastic or elastomeric insulated power cables and with relative ease in a field installation. Because circuit lengths often exceed the maximum length of a cable that can be manufactured and pulled into place in one piece, provision is typically made for joining multiple segments of the cable. Usually, the maximum segments of high voltage cable range in length between 1,000 to 2,500 feet, whereas complete high voltage cable circuits may extend for miles.

As used herein, the term "high voltage" refers to a rate of at least 15,000 volts (15 kv). Cables having such a voltage rating generally contain an electrically conductive layer (shielding) over the dielectric insulation layer. This shield layer generally consists of a carbon filled plastic or elastomer directly extruded over the insulation proper. Metal wires or tapes may be wound in a helical form concentrically around the cables on the shield system. The shield system is grounded. The potential of the conductor within the cable may be considered at hundred percent of the operating voltage of the system; and the potential of the grounded shield at zero. The voltage gradient, i.e., the difference in potential per unit thickness of the insulating medium, between the conductor and the shield may be represented by an infinite number of concentric cylindrical surfaces within the cable insulation, each surface being of the same voltage potential. In a longitudinal section, these cylindrical surfaces would then be seen as equipotential lines. The voltage gradient represented by the lines is the greatest close to the conductor and the least away from the conductor.

Also as used herein, the term cable "joint" is interchangeable with the term cable "splice." A typical cable joint involves the joining together of two cables at one point, although often more than two cables are so connected to form the joint, such as may occur at an electrical switching device, circuit breaker, fuse box or transformer. Where three cables are joined at one point, the structure may take the form of a "wye" or a "tee" joint, depending upon the angular disposition of the joined cables. In the joining of four cables at one point, the structure may take the form of a cross or of an "H" joint. Further, as will be seen hereinafter, the joining of a plurality of cables at one point may also take the form of an "in line" joint. The joining device itself is often called a connector.

In the preparation of cables for a joint, such as high voltage power cables, the conductor portion of the cable is exposed by removing some lengths of both the insulation and the shield layer. The shield layer is removed from a length of insulation so as to separate the exposed conductor and the grounded shield and thus provide adequate creepage distance from the live conductor to ground.

Such cable preparation creates an abrupt discontinuity in the electrical characteristics of the cable. Further, it exposes the cable conductor and the insulation to the ambient atmosphere, which contains moisture, gases, and particulate matter. The discontinuing of the cable shield materially increases the maximum voltage gradient (volts/mil) of the insulation in the area of the cable shield end and immediately changes the shape of the resulting electrical field to introduce high longitudinal voltage gradients along the surface of the insulation adjacent the cable shield end. Thus, the maximum voltage gradient is shifted from a radial stress, which diminishes outwardly from the conductor, to a longitudinal stress at the end of the cable shield layer. The nature of the cable insulation is such that it more readily withstands the stress in the radial direction than along a longitudinal surface or interface, and risk of breakdown is therefore greater in the longitudinal direction.

The parts used in the structure of a high voltage cable joint usually control this shift in the electrical stress characteristics of the cable.

In the past, the forming of a cable joint has generally included a stress cone built up with hand-applied insulating tapes, usually of a material in the same generic family as the cable insulation. Both skill and care as well as time are involved in this operation. Further, for any alterations made to these joints, such as the addition of an extra cable or the connection of additional or new equipment, involves considerable undoing and reconstruction of the joint. Much of the work expended to construct the original joint is essentially lost as to the new joint, and the material used in the original joint generally is not in a suitable condition for reuse.

A more recent cable joint is more easily modified, and it utilizes a stress relief shield in the form of, for example, a metallic girdle shield. There is no hand wound tape cone. A joint of this type is disclosed in U. S. Letters Patent No. 3,597,527, issued Aug. 3, 1971, to George E. Lusk and is of the so-called "wet type" in which a dielectric compound or fluid fills the space or cavity between the cable and stress relief shield and the outer housing. This space is filled to exclude air, which is generally not suitable for a dielectric medium. While this type of joint serves its purpose quite well, there is the inconvenience of handling the dielectric compound or fluid in the field, in addition to which the compound may be workable only at certain temperatures.

It is an object of the present invention to provide an improved joint for the connecting of high voltage power cables.

It is another object of the present invention to provide a universal cable joint utilizing a preformed stress relief element that has suitable dielectric properties and in addition is capable of accommodating various power cable diameters for a given element in a high voltage system.

It is yet another object of the present invention to provide a universal cable joint having the capability of being easily installed in the field and being modified after installation without appreciable loss of either labor or material.

It is a further object of the present invention to provide a universal high voltage cable joint having provision for a convenient and safe voltage test point.

These and other objects of the present invention are more particularly set forth in the following detailed description and in the accompanying drawings of which:

FIG. 1 is a plan view of the exterior of a cable joint embodying various features of the present invention;

FIG. 2 is a longitudinal side view in section of the cable joint of FIG. 1;

FIG. 3 is a plan view of a housing member of the cable joint of FIG. 1;

FIG. 4 is a side view in section of the housing member taken along the line 4—4 of FIG. 3;

FIG. 5 is a plan view of a terminal utilized in the cable joint of FIG. 1;

FIG. 6 is an end view of the terminal of FIG. 5;

FIG. 7 is a perspective view of a stress relief element utilized in the cable joint of FIG. 1;

FIG. 8a is a sectional view of the stress relief element taken along the line 8a—8a of FIG. 7;

FIG. 8b is a sectional view taken along the line 8b—8b of FIG. 2;

FIG. 9a is a sectional view of a portion of a power cable depicting a typical pattern of an electric field, especially at the end of the shield of the cable.

FIG. 9b is a sectional view similar to FIG. 2 and depicting the pattern of the electric field within the preferred embodiment of the cable joint;

FIG. 10 is a sectional view illustrating an alternative construction of the stress relief element of FIG. 8a;

FIG. 11 is a sectional view of a portion of a voltage test point assembly taken along the line 11—11 of FIG. 1;

FIG. 12 is a side elevational view of an insulating sleeve member of the voltage test point assembly of FIG. 11;

FIG. 13 is a sectional view of the insulating sleeve member taken along the line 13—13 of FIG. 12;

FIG. 14 is a front elevational view of a cover member of the voltage test point assembly of FIG. 11;

FIG. 19 is a side sectional view of the joint taken along the line 19—19 of FIG. 18.

Figure 15:
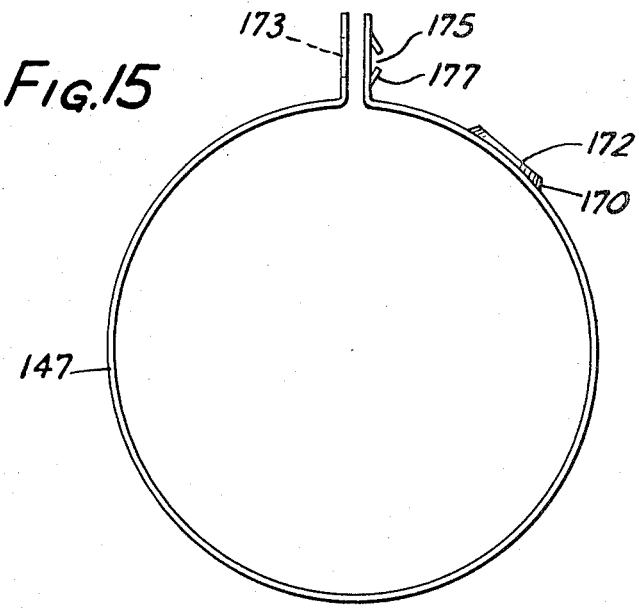
FIG. 15 is a side elevational view of a clamping member of the voltage test point assembly of FIG. 11.

Referring now to FIGS. 1 and 2, the reference numeral 25 refers generally to a power cable joint in accordance with a preferred embodiment of the present invention.

Very generally, a power cable 27, which may be a high voltage power cable, has applied thereon in telescopic relation several unitary parts of a general connector assembly 28 that forms a part of the complete cable joint 25 and of which a tubular housing or body 29 is an important structural part. At the forward or connection end of the housing 29, as an integral part thereof, is a junction means, such as a pad 31.

Internally at the connector assembly 28, a stress relief element 69 is interposed between portions of the tubular housing 29 and portions of a prepared end of the cable 27. As will be described in detail hereinafter, the element 69 is under radial compressive stress and surrounds in particular a region 120 of high electrical stress adjacent an end 119 of a shield layer 45 of the cable.

The element 69 is divided into portions. A first portion 121 is compressible, has electrically conductive properties, and forms a stress control shield. Contiguous to this first portion is a second portion 127, which is of a high dielectric strength. This second portion provides dielectric insulation adjacent the stress relief shield (first portion) and in surrounding relation to the high electrical stress region 120 of the cable. Contiguous to this second portion is a third portion 129 which is compressible and has electrically conductive properties.

As is described in detail hereinafter, these portions are so related to one another within the body of the element 69 that the compressible portions cause continuous compliance of the entire element to the end of the cable it surrounds in spite of the presence of the high dielectric portion. Such compliance eliminates the occurrence of dielectrically objectionable voids between the bore of the element and the cable, which could lead to dielectric breakdown, and this compliance is maintained even when the cable expands and contracts with temperature changes. At the same time the element will accommodate a cable within a relatively wide range of diameters.

A terminal or connector, such as a spade terminal 71, is applied to a bared portion of a conductor 57 of the cable and is electrically interconnected to a like terminal of a second connector assembly 28a by an electrically conductive spacer 93. A retainer cap 33 and bolts 35 secure the cable joint.

Bypassing the cable joint and joined by a compression type butt connector 37 are ground wires 39. These ground wires 39 are extensions of concentric neutral or ground wires 41, which are wound around and in contact with the shield layer 45 of the power cable 27. These wires 41 are removed from a portion of their surrounding relation with the cable 27 and are bound as at 43. An assembly 135 provides a convenient and safe point for testing or checking voltage at the cable joint.

More specifically and with reference to FIGS. 3 and 4, the housing 29 in combination with the integral junction pad 31 is formed of any suitable dielectric grade plastic material, such as an epoxy resin. The external surfaces of the housing, except for surfaces of the pad 31, are electrically conductive as, for example, by the application thereon of a metal coating 47. This coating may be of any suitable metal, such as tin, and may be applied in any suitable manner, such as spraying. the housing is cored centrally for substantially its entire length, the same providing a passageway 49 and a restricted opening 51 for receiving the prepared end of the cable 27. The restricted opening 51 communicates with a transverse opening 53 in the pad 31. Certain of the interior surfaces of the housing 29 and the interior surfaces of the transverse opening 53 are electrically conductive as, for example, by application thereto of an electrically conductive coating 55. The electrically conductive surfaces, both inner and outer, provide a dielectric shielding of the tubular housing 29.

Referring again to FIG. 2, the typical high voltage power cable 27 includes the conductor 57, dielectric insulation 59 surrounding and encasing the conductor 57, the shield layer 45 surrounding the dielectric insulation 59, and the concentric neutral or ground wires 41 wound around and in contact with the shield layer 45.

The power cable 27 may be prepared for the making of the joint by first being stripped to expose a length of the bare metal conductor 57 at the end of the cable.

The shield layer 45 is removed from around a length of the dielectric insulation 59. As mentioned previously, the concentric ground wires 41 are bound as at 43, and the common ground wires 39 extend therefrom to form the bypass ground connection and other connections, such as at a tab 61 (FIG. 1) as will be described further hereinafter. This leaves an exposed portion of the shield layer 45 intermediate the binding 43 and the exposed portion of the dielectric insulation 59. A lubricant, such as a silicone grease, is applied to the cable insulation and shield. A protective plastic guide cap (not shown) is temporarily placed over the end of the cable conductor to protect internal components of the connector assembly 28 from being damaged by the metal conductor strand ends during assembly.

A castellated clamp 63, a cable entrance housing 65, a conductive elastomeric sealing sleeve 67, and a cushion gasket 68 are all slipped over the prepared end of the cable. The stress relief element 69 is then slipped over the exposed portion of the cable insulation 59 and the end portion of the cable shield 45. The protective guide cap is then removed from the tip of the bar conductor, its purpose having been fulfilled. The terminal 71 includes a body portion 73, an axial bore 75 partially therethrough and an extended or spade portion 77, all of which are best seen in FIGS. 5 and 6. This terminal is slipped over the bared portion of the conductor 57 and then secured thereto by a suitable compression or crimping tool (not shown), resulting in crimps 79 (FIG. 2).

Returning again to FIG. 2, the prepared cable end is then inserted into the passageway 49 of the tubular housing 29, the spade 77 of the terminal 71 then being disposed in the reduced opening 51 of the housing and the transverse opening 53 of the pad 31. It will be noted that a substantial portion of the stress relief element 69 likewise fits within a portion of the passageway 49 of the housing. The conductive elastomeric sealing sleeve 67 is interfitted with the base portion of the cable entrance housing 65 in an interlocking manner near the tab 61 of the entrance housing. The outer surface of the base end of the tubular housing 29 is provided with threads 81 for receiving a complementary threaded portion of the castellated cable entrance clamp 63. The clamp 63 is drawn up tightly against a flange 83 of the entrance housing 65 to tighten the flange securely against the base of the tubular housing 29. The cushion gasket 68 is interposed between the adjacent faces of the two parts.

When the terminal 71 is fully inserted in the tubular housing, an opening 85 in the spade (FIG. 5) is positioned centrally of the transverse opening 53 in the integral junction pad 31 of the housing. The electrically conductive surface or coating 55 is extended within the restricted opening 51 and the transverse opening 53.

The outer surfaces of the entrance housing 65 and the cable entrance clamp 63 are also electrically conductive in a similar manner as the tubular housing 29 or, as provided in the preferred embodiment, are made of a suitable metal as indicated. Thus when the connector assembly 28 is completely applied to the cable, these surfaces are electrically tied together. One of the ground wires 39 is then connected to the tab 61 of the entrance housing 65, and this connection grounds the outer conductive surfaces of the entire connector assembly 28.

In the completed cable joint 25, the pad 31 of the connector assembly 28 is joined in a fixed relation to a like pad 31a of a like connection assembly 28a. For illustration purposes, reference numerals with subscript letters indicate like parts of other assemblies. Accordingly, the prepared end of one cable is mechanically and electrically connected to the prepared end of a second cable in a manner shown in FIG. 2. The pad 31a of the second cable module or connector assembly 28a is placed in superimposed relation with the pad 31 of the first cable module or connector assembly 28. An insulator sealing cap 87 having an electrically conductive insert 89 therein and a gasket 91 are provided to cover the surface of the junction pad 31. The electrically conductive insert 89 extends into the transverse opening 53 in the junction pad 31. The insulator sealing cap 87 also has an outer surface that is conductive and is grounded by its contact with the outer surface of the tubular housing 29. The structure of the entire joint insulates all electrically live parts internally of the joint, providing safety of operation for an environment of equipment and personnel.

The conductive metal spacer 93 is interposed between the spades 77 and 77a, and another gasket 91a is disposed between the adjacent surfaces of the junction pads 31 and 31a. The aforementioned superimposed relation of the pad brings into vertical alignment the transverse openings 53 and 53a of the pads 31 and 31a, and the spacer 93 in its inserted relation occupies a substantial part of the aligned openings. It is noted that the metal spacer 93 is in full electrical and mechanical contact with the spades 77 and 77a. Thus a good electrical conductive path is provided from the conductor 57 of one power cable to the conductor 57a of the other cable.

The mechanical connection of the spades 77, 77a and the spacer 93 is effected by a connector bolt 95, which is inserted through the opening 85 in the spade 77, the spacer 93, and the opening 85a in the spade 77a. A head 97 of the bolt 95 is in contact with the spade 77, and a nut 99 is in contact with the spade 77a. A suitable spring type washer may be placed between the nut 99 and the spade 77a to ensure the maintenance of adequate contact pressure between all of the parts joined by the bolt 95. The joint is completed by applying the insulator sealing cap 87a, having an electrically conductive insert 89a therein, to the junction pad 31a. A gasket 91b is interposed therebetween. The conductive insert 89a enters a portion of the transverse opening 53a. The joint is completed with a retainer cap 33a and by retaining cap nuts 103 being securely tightened on each of the retainer bolts 35. It is noted that the retainer caps 33 and 33a are in the form of a cross and that the retainer bolts 35 fit through bolt openings (not shown) near the end of the extended arms of the cross. The pads 31 and 31a are circular (FIG. 3), and this form of the retainer caps disposes the bolts outside the circumference 105 of the junction pads. Thus, the circular superimposed junction pads 31 and 31a provide the joint with a capability of being universal as to type of joint formed, since the connector assemblies 28 and 28a may be rotated with respect to each other to make the in-line joint that is illustrated in FIG. 2 or another type, such as a right angle joint (not illustrated).

The electrically conductive insert 89 is made of a suitable electrically conductive elastomer, such as an elastomer made electrically conductive in a known manner, and is dimensioned to provide a compressive fit between the connection bolt head 97, the electrically conductive interior surface of the transverse opening 53, and the insulator sealing cap 87 at the head end of the bolt 95. At the other end of the bolt, the insert 89a in like manner fits intermediate the retainer nut 99 and the inside electrically conductive surface of the transverse opening 53a and the insulator sealing cap 87a. Thus, electrical continuity is established between these parts, and the same voltage potential is maintained between the spades 77, 77a and the inside surfaces of the outer securing insulator sealing caps 87 and 87a.

The stress relief element 69 is disposed within the portion of the tubular housing 29 and a portion of the cable entrance housing 65 such that its internal diametral surface is in direct contact with portions of the prepared cable end. Both the tubular housing and the cable entrance housing are rigid, and as is described in detail hereinafter, this structure places the element 69 under radial compressive stress and provides a continuous compliance of the element at the interface between its internal diametral surface and the surface of the cable to form and maintain an effective electrical contact and a seal at the interface.

Referring now in more detail to the stress relief element as best seen in FIG. 7 and 8a, the element is in the general form of a cylinder having a general outer surface 107 and a general axial bore 109 therethrough which provides a general inner surface 111. As used throughout the present description, the terminal end of the element 69 is that end viewed at the left in FIG. 7 and generally indicated by the reference numeral 112, and the base end of the element is that end viewed at the right in the figure and generally indicated by the reference numeral 114. There is a counterbore extending axially part way into the terminal end 112, which provides an inner surface 113, and another counterbore extending axially part way into the base end 114, which provides an inner surface 115. Both of these counterbore surfaces are offset outwardly from the generally axial inner surface 111 of the element. A shoulder 116 is formed at the offset between the inner surface 115 and the general inner surface 111. A chamfer 117 is at the entrance of the base end 114 counterbore and adjoins the inner surface 115.

It will be noted in FIG. 2 that when the element 69 is disposed in the completed joint, the inner surface 113 at the terminal end of the element surrounds the end of the body portion 73 of the terminal 71, and the inner surface 115 at the base end of the element surrounds the end portion of the shield layer 45 of the prepared cable end. The shoulder 116 contacts the end 119 of the shield layer 45. This end 119 is the terminus of a taper 118 made at the end of the shield 45 to bring about a more uniform wall thickness around the insulation at this point. This is especially important where the shield layer 45 is applied to the cable by extrusion and may not be of a completely uniform thickness around the circumference of the cable.

Thus, an annular portion of the stress relief element 69 represented by the inner surface 115 both abuts and surrounds the end of the shield layer 45 of the power cable. The diameter of this annular portion is slightly smaller than the diameter of the shield layer to form a close fitting, intimate relation at the interface between the surfaces of the two. Such intimate association or contact excludes air, moisture and other ambient elements and provides an electrical contact that in turn provides stress relief in the high electrical stress region 120 adjacent the end 119 of the shield 45, as will be described in detail hereinafter.

The diameter of the general inner surface 111 is less than the diameter of the dielectric insulation 59 of the cable. The outer diameter of the element 69 is essentially the same as the inner diameters of the tubular housing 29 and the adjacent cable entrance housing 65 so that the outer surface 107 of the element and the inner surfaces of the surrounding parts are in contact with each other when the joint structure is assembled over the prepared cable end. Because the surrounding bodies are rigid, the stress relief element 69 is confined and held under radial compressive stress between the rigid outer bodies and the cable, as illustrated in FIG. 8b. The arrows depict the direction of both the initial and reactive forces, i.e., radially outwardly to the rigid entrance housing 65 and radially inwardly to the cable. These forces react in the same manner on all surfaces of the cable surrounded by the element 69.

The radial compressive stress and the general compressible nature of the element 69 combine to provide continuous compliance of the element to the cable without dielectrically objectionable voids. The sponge material of the stress element 69 yields when the cable expands and follows when the cable contracts, thus, maintaining a relatively constant pressure at the interface between the element and the prepared cable end. The pressure exerted is sufficiently high to maintain the desired longitudinal dielectric strength of the interface yet low enough to avoid excessive plastic deformation or "cold flow" of the cable insulation even during periods of high operating temperature when the cable expansion is the greatest and its resistance to plastic deformation is the least.

The above described dispostion of the inner diametral surface of the stress relief element 69 cooperates with the earlier mentioned cable preparation in which the cable may be stripped or otherwise initially prepared to expose lengths of the conductor 57, the dielectric insulation 59, and the shield layer 45. These lengths are a function of the creep strength of the total cable joint and of the voltage of the system on which it is employed.

An example of one specific construction of the preferred embodiment has been built utilizing the following approximate dimensions: length of the stress relief element 69, 5 and ¼ inches; outside diameter of the element, 2 and ½ inches; length from cable end to the binding of the ground wires, 15 and ½ inches; length of the bared conductor 57, 3 inches; and length of the bared dielectric insulation 59, 4 and ½ inches. It will be noted upon an examination of FIGS. 2, 3 and 4 that the passageway 49 in the tubular housing 29 has walls tapering outwardly toward the open base end of the housing. Accordingly, the stress relief element 69 preferably employs a slight taper on its outer surface to ease the assembly of the parts. The 1° draft has been utilized for this taper, which is directed such that the terminal end 112 is slightly smaller in outer diameter than the base end 114 of the element.

Having observed the disposition of the stress relief element 69 in its interposed relation between at least portions of the tubular housing 29, the entrance housing 65 and the prepared end of the cable, attention may now be given to the structure of the element 69 itself. This element may be an assembled structural composite of separate portions having defined characteristics, or it may be formed in a continuous unit with a less abrupt change between the portions of defined characteristics. For purposes of illustration, the assembled composite is shown and described as best seen in FIGS. 7 and 8a. It should be understood, however, that the invention is not limited to this assembled composite construction.

Referring now in detail to FIG. 8a, the base portion 121 preferably is made of a closed-cell sponge elastomer and has an inner surface 111a in line with the general inner surface 111 of the general axial bore 109 through the element 69 and a tapered surface 123 adjoining the surface 111a and directed outwardly from the axis and away from the base end 114 of the element. This tapered surface forms a cavity in the base portion 121 having a shape closely resembling that of a truncated cone. Extending inwardly in the base portion is the counterbore having the surface 115 and terminating at the shoulder 116. The chamfer 117 is at the leading edge of the counterbore.

All inner and outer surfaces of the base portion 121 are caused to be electrically conductive in a suitable manner, such as by covering the surfaces with a layer 125 of a conductive coating substance. Such conductive surfaces and shape of the base portion cause it to be stress control shield. One suitable substance for this purpose is manufactured by General Electric Company and is identified as General Electric Semi-Conducting Silicone Resin SR 531. An alternative is to make the entire base portion 125 conductive by insertion of electrically conductive carbon particles within the walls of the sponge material.

Another part of the composite element 69 is the second or mid portion 127. This portion 127 has an outer surface at its base end of a shape that complements and interfits with the cavity of the base portion 121 when the two are axially aligned. This second portion preferably is made of a closed-cell elastomer of a higher density and possibly smaller average cell size than that of the base portion 121 to provide increased dielectric strength in the zone of the element occupied by this second portion. The dielectric strength of the body material constituting the aforementioned first portion 121 is relatively unimportant in view of its electrically conductive surface. Absent this conductive surface, however, the sponge material does have an inherent dielectric strength, and this second portion when compared therewith is, of course, of higher dielectric strength. The higher density and smaller cell size of this portion give in a nature approaching that of solid material. Alternatively, the material may be solid elastomer.

This second portion has an angular or generally frustoconical form and preferably has a tapering cavity in its terminal end for receiving yet another part of the element. This other part, or third portion 129 has an outer surface at its base end that is shaped to complement and interfit with the cavity of the second portion 127 when the two portions are axially aligned. It is this portion that has the inner surface 113 outwardly offset from the general inner surface 111 of the element. The material for this third portion 129 may be the same as that used for the base portion 121 and also may be made electrically conductive in the same manner. Its density is lower than that of the second portion 127 providing a graded density stress element system, the higher density zone for the higher voltage gradient region, as will be described in more detail hereinafter. This third portion 129 completes the general cylindrical form of the element.

The composite element 69 may be completed by assembling the unit portions axially in their interfitting relation and bonding the portions together with a suitable bonding agent. Alternatively, the element 69 could be continuously molded in one piece with the aforementioned members of the element being zones of defined characteristics.

The effect of disposing the illustrated composite stress relief element 69 in selective, surrounding relation to the end 119 of the shield layer 45 is best seen in a comparison between FIGS. 9a and 9b. Referring first to FIG. 9a, typically, the electrical conditions adjacent the end of the shield layer 45 are extremely severe when compared to those within the run of the cable 27 under the shield layer 45. For example, equipotential lines 131 are parallel within the run of the cable where surrounded by the shield 45. Beyond the end 119 of the shield 45, however, the equipotential lines deflect out and around to emerge from the cable insulation 59 relatively close together, the result of which is a region of high voltage gradients longitudinally in this region of the insulation. Under the shield layer 45, on the other hand, the voltage gradients are radial, decreasing outwardly within the dielectric insulation 59. The high longitudinal electrical stress may cause insulation failure. It is such a region that is represented by 120 in FIG. 2. Whatever electrical stress is built up in this region adjacent the end 119 of the shield 45 and under the shield portion 121 of the element 69 is contained without rupture by the high dielectric strength portion 127 contiguous to the portion 121 and surrounding the region 120 of the cable.

Referring now to FIG. 9b, the advantageous application of the illustrated inner stress relief element 69 in a cable joint is shown. The base portion 121 of the element, which is electrically conductive as by a conductive surface, surrounds the end 119 of the shield layer 45 in a gripping relation. The conductive surface 125 is grounded through its intimate association with the cable shield layer 45, which is grounded by the concentric ground wires 41 (FIG. 1). As this shield portion of the stress relief element tapers outwardly from the dielectric insulation 59 of the cable, the electric field expands, as noted by the equipotential lines 131, and the voltage gradients do not concentrate longitudinally, as noted by the gradual bending outwardly of the lines under the tapered surface 123.

It will be recalled that the third portion 129 is also electrically conductive and as are certain of the inner surfaces of the tubular housing, as at 55, and all of the external surfaces of the tubular housing, as at 47. Further, the outer surfaces of the insulation of sealing caps 87 and 87a are electrically conductive and their inner surfaces are in intimate association with the electrically conductive inserts 89 and 89a respectively. All of these surfaces provide electrostatic shielding that controls the electric field through the entire cable joint 25, as depicted by the pattern of the equipotential lines 131. The third portion 129, although in contact with the one-hundred percent potential of the terminal 71, is separated from ground (zero potential) by the high dielectric strength mid portion 127 of the element and the high dielectric strength material making up the tubular housing 29.

It will be noted that a space or cavity exists between portions of the terminal 71 and the tubular housing 29 as indicated at reference numeral 132 (FIG. 9b). This space 132 is not filled with a high dielectric medium to exclude air since the electric field is confined in spaces bounded by inner electrode (one hundred percent potential) and outer electrode (ground potential) surfaces. The subject space or cavity is bounded on all sides by electrode surfaces of the same potential (one hundred percent potential) and hence is subjected to no voltage gradient.

Since voltage stress tends to increase in the area surrounding an abrupt termination of a shield layer, an alternative construction of the composite stress relief element 69 is shown in FIG. 10 where the tapered surface 123 terminates in a rounded tip 133 inwardly of the general outer surface 107 of the element 69. This rounded tip then lies within the contiguous higher dielectric material of the second portion 127 of the element 69.

The stress relief element 69 includes closed-cell elastomeric sponge portions that are both compressible and compliable. The method of producing the element 69 may utilize molding in a manner well known in the art. During the production of the element, voids, i.e., that which is the result of material contamination or process irregularities, are prevented from occurring, and the size and distribution of the gas cells are selected and controlled to obtain desired electrical and mechanical properties. Thus, the closed cells are not voids but are purposely formed under controlled process conditions. This cellular structure in a suitable elastomer in accordance with the present invention provides a stress relief element that is capable of withstanding operational or contingency stresses, whether electrical, thermal, or physical that are typical in a dielectric system.

Suitable elastomers for the illustrated stress relief element 69 include silicones, ethylene-propylene, fluorosilicones, and fluorinated elastomeric copolymers. An example of a fluorinated copolymer is Viton, a trademark of E. I. duPont de Nemours & Company.

A satisfactory cellular structure for the base portion 121 of the stress relief element 69 when made of silicone rubber is a density of 0.022 pounds per cubic inch with a maximum cell diameter of from 0.15 millimeters to 0.75 millimeters. This same material and cellular structure may also be used for the third portion 129 of the stress relief element. A satisfactory cellular structure for the second (high dielectric) portion 127 of the stress relief element 69 when made of silicone rubber can be also a density of 0.022 pounds per cubic inch with a maximum cell diameter of from 0.15 millimeters to 0.75 millimeters.

In the foregoing material description, it will be noted that both material density and cell size are variables. For the second portion, the preferred material can be of smaller average cell size than that of the first portion and the density can be greater. Dielectric strength is increased in a closed-cell elastomer as the cell size is decreased, since the dielectric strength of a gas filled space is an inverse function of the diameter of the cell.

This structure of the stress relief element 69 in combination with its relation to the rigid outer housings in the present embodiment produces many advantages over known joint structures or devices. Among these advantages are the capability of the connector assembly 28 of maintaining a uniform, relatively constant, radial pressure at the interface of the stress relief element and the prepared cable end, especially in the region of high electrical stress 120 of the cable, so as to effect good electrical contact in this region without dielectrically objectionable voids on cables of differing diameters, and there is no need for the addition of a high dielectric fluid or compound and no need to add or remove a hand-wound tape cone in the present structure, simplifying the field installation and modification of the cable joint. With respect to field modification of the joint, it can be seen that the joint can be opened and connectors added or subtracted after the initial installation without appreciable loss of original labor and material. Joining more cables to a joint will be described hereinafter.

Further, the present structure of the element 69 causes it to yield when the cable expands and to follow when the cable contracts. During both instances, the present element 69 complies with the generally cylindrical surface of the portion of the cable which it surrounds, thus assuring contact at the interface even if the general cylindrical surface is slightly out of form, such as being out of round or uneven or both. During these volumetric changes of the cable, the radial compressive forces resulting from the present structural combination maintain the relatively constant pressure at the interface sufficient to effect the aforementioned electrical contact without allowing space to be created at the interface of the element and the cable or even allowing a lower pressure at the interface that would diminish the effect of the electrical contact. Yet the pressure is low enough to avoid excessive plastic deformation (cold flow) of the cable dielectric insulation during periods of high temperature when the cable expansion is the greatest and the resistance of the insulation to plastic deformation is the least. Thus, the complete cable joint structure is capable of operating effectively at temperatures higher than the typical temperatures of previously known devices.

The present structural combination also provides the connector assembly 28 with the capability of accommodating cables of differing diameters within a range of cable sizes. For example, the illustrated connector assembly with the stress relief element 69 will accommodate cable sizes of 500 MCM, 750MCM, and 100 MCM. More specifically, each size will accommodate approximately a 0.15 inch range of cable diameter. For each cable size accommodated, the above noted uniform radial pressure at the interface is effected. Further, this uniform radial pressure is maintained under anticipated ambient conditions regardless of the current conducting state of the high voltage system on which the cable is employed. In the cable preparing stage, however, a properly sized terminal 71 is used for each different size of cable prepared.

Summarizing the advantages of the structure of the present stress relief element 69 and its interposed relation between the rigid housings 29 and 65 and the cable 27 prepared end, the present element (a) has the ability to accommodate slightly out-of-shape cylindrical forms, such as the bared insulation of high voltage cables; (b) accommodates a diametral range of these cables; (c) maintains sufficient radial pressure to effectively form a seal and a good dielectrical contact at the interface of the element and the cables under both (a) and (b) even during volumetric changes of the cables as they respond to temperature excursions; (d) provides (a), (b) and (c) while preventing excessive internal pressures from developing during periods of high thermal conditions that could over stress the cable and cause plastic deformation of the insulation; and (e) provides (d) and yet does not allow inadequate pressure or space to develop at the interface of the element and the cable whereby the effective dielectrical contact between parts would diminish or be lost entirely.

The present invention also contemplates the ability to test the cable system conveniently and safely at the universal joint 25 to see if the system is live or dead, and if live, what the voltage is without having to disconnect the joint structure. Referring again briefly to FIG. 1, a voltage test point assembly 135 is generally seen around the outer surface of the tubular housing 29 intermediate two spaced apart lands 137.

Referring now in detail in FIG. 11, the voltage test point assembly 135 includes a rod or pin 139 having a foot or base 141, an insulated sleeve 143 having a neck 145 which supports the pin 139, a clamp 147 for securing the insulated sleeve 143, a threaded fastener, such as a bolt 149, for tightening the clamp 147, and a cover cap 151 having a pull tab 153 to cover the insulated sleeve neck 145 and the pin 139.

Returning briefly to FIGS. 3 and 4, it was mentioned previously that the outer surfaces of the tubular housing 29 are electrically conductive as by a metal coating 47.

This coating is continuous on the outer surfaces except for a pair of spaced apart ring blanks 155 in the coating intermediate the two lands 137. These two blanks leave an isolated ribbon 157 of coating around the tubular housing centered between the two lands 137. It is this isolated ribbon 157 with which the foot 141 of the pin 139 makes contact when the voltage test point assembly 135 is applied to the tubular housing.

Referring now to FIG. 12, the insulated sleeve 143 is seen to be a continuous circular band having the integral neck 145 protruding outwardly therefrom. The neck 145 is similar to a tube and has a longitudinal opening 159 centered therein. This opening 159 is essentially the same diameter as the pin 139 and it communicates with a larger and lower opening 161 which is essentially the size and shape of the foot 141 of the pin 139. The length of the pin 139, however, exceeds the length of the neck 145, and, as best seen in FIG. 11, extends above the neck so that a tip 163 of the pin is exposed. An integral protuberant ring 165 surrounds the neck 145 and is a detent for the cover cap 151, which, as best seen in FIG. 14, has a complementary groove 167 internally of the cap to interfit with the ring 165 when the cap is placed on the voltage test point assembly 135. A bore 169 in the cap is essentially the same diameter as the neck 145 of the insulated sleeve 143 so that there is a general interference fit of the cap on the sleeve. The pull tab 153 is provided with a finger hole 171 transversely therethrough to assist in handling the cap 151.

The insulated sleeve 143 and the cover cap 151 are each made of a suitable elastomeric material, such as an ethylene propylene elastomer. The cover cap 151 is made electrically conductive in a suitable manner, such as applying a conductive coating to the surfaces thereof as on the stress relief element 69. Since the ribbon 157 on which the pin 139 is in contact is isolated from ground, the pin "floats" above ground except when the cover cap 151 is in place on the neck 145. The tip 163 of the pin 139 extends sufficiently to contact the electrically conductive surface of the cap 151 in a recess 168 in the cap provided for receiving the tip. The lower edge surfaces of the cap 151 contact an annular flange 170 surrounding an opening 172 (FIG. 15) in the clamp 147, which may be of metal and is electrically conductive. Thus, by connecting one of the ground wires 39 (FIG. 1) to the clamp 147, such as at the bolt 149 (connection not shown), the entire test point assembly 135 will be grounded when the cover cap 151 is snapped in place, and the pin 139 and isolated ribbon 157 no longer "float."

It is a feature of the illustrated voltage test point assembly 135 that it is rotatable about the circumferential surface of the tubular housing 29. The ring type clamp 147, as best seen in FIG. 15, is useful for this purpose. The clamp, when in the flat, has the appearance of a long rectangular strap with certain openings through it. The ends of the strap are bent so that when the strap is formed into a circle, the bent ends face each other as seen in the figure. An opening 173 in one end is a clearance hole for the threaded fastener or bolt 149 (FIG. 11) and an opening 175 in the opposing end accommodates the threaded portion of th bolt 149. A pair of spring type thread retainers 177 attached to the clamp ride in the threads of the bolt 149 and provide the action of a lock nut for the bolt. Thus, as the bolt is turned, the opposed bent ends are drawn together to decrease the distance therebetween and to tighten the clamp on the insulated sleeve 143. The opening 172, spaced from the ends, is a clearance hole for the neck 145 of the insulated sleeve 143.

Thus, it can be seen that when the clamp 147 is loosened, the entire assembly is free to rotate around the circumference of the tubular housing although it maintains its position intermediate the pair of lands 137. Such action provides test personnel with a means of locating the test pin 139 in a convenient and accessible position for performing a test at any cable joint that utilizes the illustrated joint structure. At any rotative position of the voltage test point assembly 135, the foot 141 of the test pin 139 is in contact with the isolated ribbon 157 of the electrically conductive surface of the tubular housing 29.

Referring once again to FIG. 11, the material forming the tubular housing 29, as mentioned previously, is of high dielectric strength, and it is well known that a dielectric medium between two conductors forms a capacitor. Thus, the material of the tubular housing 29 intermediate the inner electrically conductive surface 55 and the outer isolated strip 157 forms a capacitor of which the test pin 139 through its foot 141 is one terminal. By removing the cover cap 151, the exposed tip 163 of the test pin 139 is accessible for test purposes. A test circuit including a measuring device (not shown) well known to one skilled in the art is then connected between the tip 163 and ground to measure the voltage on the cable system.

This voltage test point assembly 135 not only provides a means that is convenient for measuring the voltage at the joint, but also a means that is safe for personnel. The surface of the isolated ribbon 157 is relatively small as a plate of a capacitor, and thus the capacity of the capacitor is very low. Since the reactance is an inverse function of the capacity and thus is correspondingly high, it provides protection to personnel making voltage tests.

Figure 16:
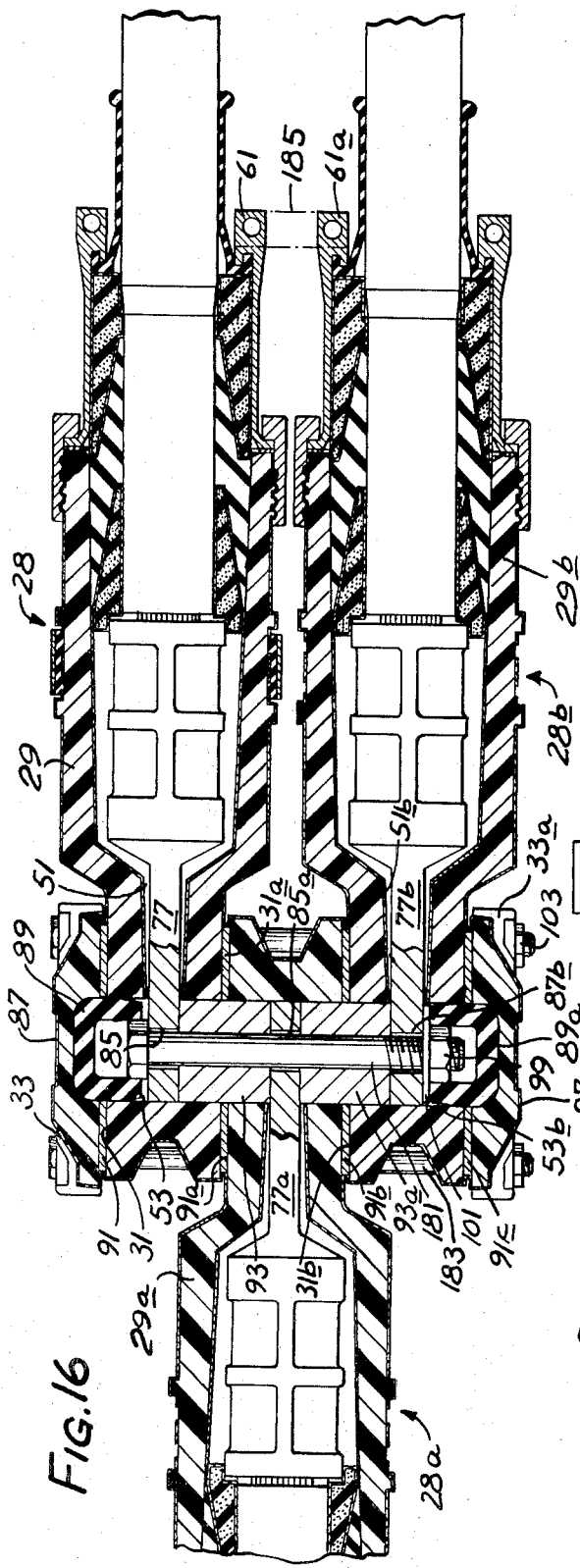
FIG. 16 is a side sectional view of the cable joint similar to that of FIG. 2 wherein another cable is added in-line to the joint.

When it is desired to form a joint between three cables, three modules or connector assemblies 28 may be employed in a configuration as shown in FIG. 16. In such instance, the prepared end of three power cables have inserted relation with the corresponding structural parts of the joint in a manner as previously described in connection with the structure of FIG. 2. Thus, as shown in FIG. 16, the spade 77 is electrically connected by the metal spacer 93 to the spade 77a. The gasket 91a is interposed between the junction pads 31 and 31a. In a similar manner the spade 77a is electrically connected to the spade 77b by the spacer 93a, and the gasket 91b is interposed between the junction pads 31a and 31b. The three spades and the two spacers are secured in superimposed relation by the bolts 181. These bolts are similar to the bolts 95 shown in FIG. 2 except that they are longer to accommodate the third joint structure. The joint is completed by being capped on both ends with the insulator sealing caps 87, 87a and the adjacent gaskets 91, 91c, respectively, and having conductive inserts therein 89, 89a. This group is secured together by the retainer caps 33, 33a and retainer cap bolts 183 and nuts 103. The bolts 183 are slightly longer than the similar bolts 35 of FIG. 2.

The three cable joint illustrated in FIG. 16 is of the in-line type wherein the top and bottom modules are parallel to each other. Under short circuit current condition, the magnetic fields that inherently surround the modules would cause a force to exist between the two parallel connector assemblies. To overcome this force and tie the assemblies together for a rigid joint, a strap 185 may be bolted to the tabs 61, 61a. Alternatively, the joint could be made a "tee" joint simply by rotating either one of these parallel assemblies to a position lying at 90° to the in-line portions of the joint.

In a similar manner, it can be seen that a fourth cable could be added to the joint of FIG. 16 by the addition of another spacer 93, a longer connector bolt 181, and longer retainer cap bolts 183. The joint could take any one of several forms, such as a cross, a "tee," or an in-line form.

Figure 17:
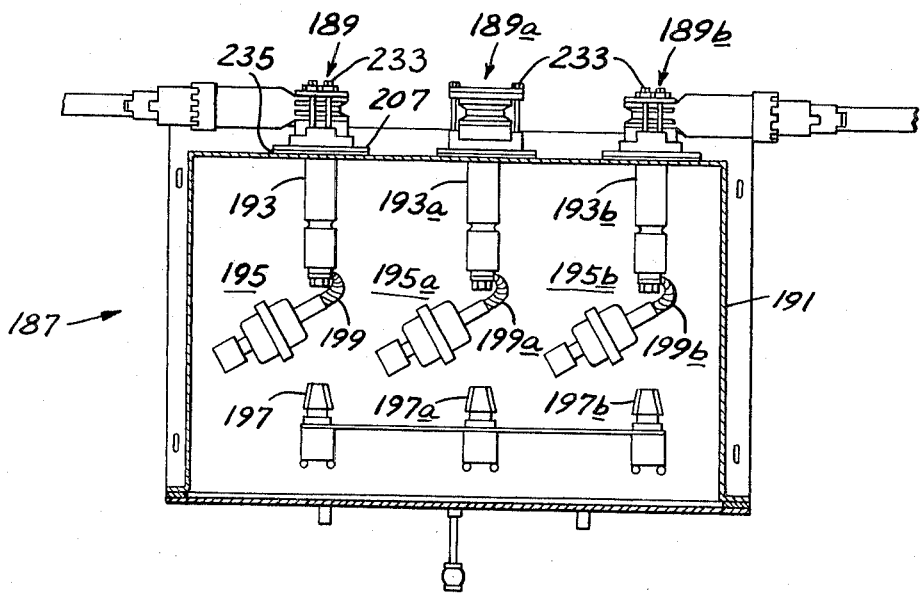
FIG. 17 is a sectional view with parts shown in elevation of a switching device utilizing a variation of the cable joint of FIG. 1.
Figure 18:
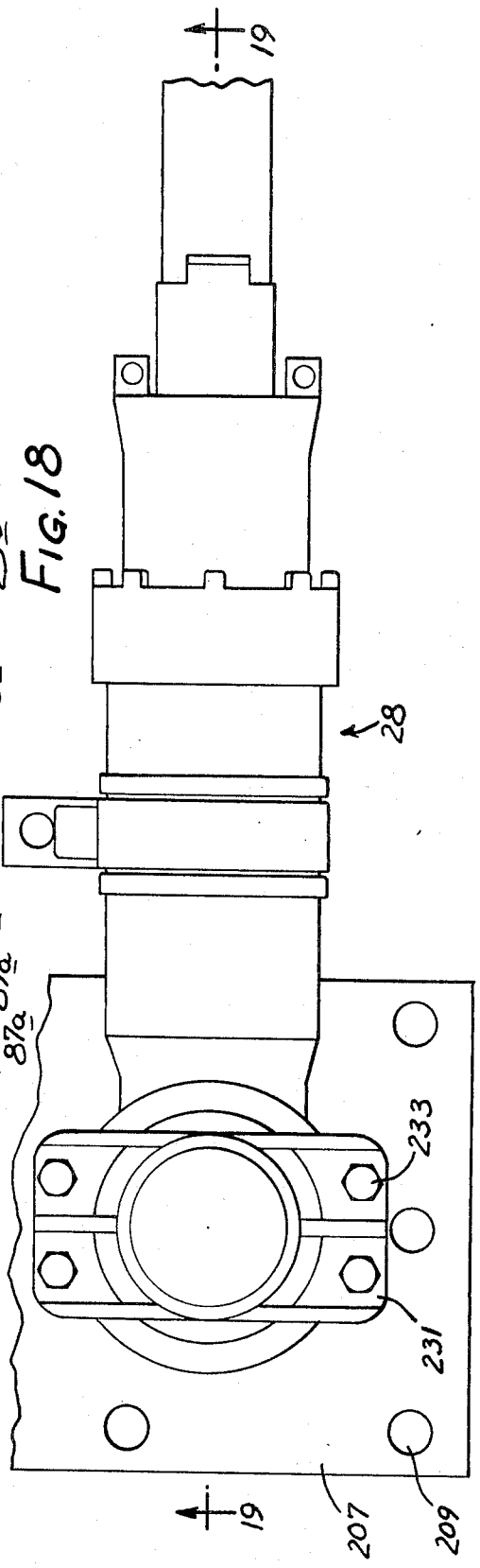
FIG. 18 is a plan view of the exterior of the joint utilized in the switching device of FIG. 17.

A modification of the present joint structure for an alternative use is shown in FIGS. 17, 18 and 19. Referring first to FIG. 17, there is shown a switch structure 187 employing three service entrances, indicated generally as 189, 189a and 189b. These are mounted on and enter through the wall of a tank 191 by utilizing a special bushing 193 at each entrance and indicated 193, 193a, and 193b respectively. These three entrances may represent a typical three phase electrical power switch. Moveable contacts 195, 195a and 195b are provided inside the switch structure 187 and are adapted to coact with stationary contacts 197, 197a and 197b, respectively, for closing and opening the switch. These contacts may be mechanically tied together to function as a three pole unit, or they may be operated independently of each other. The moveable contacts are connected by flexible braid conductors 199, 199a, and 199b to the bushings 193, 193a, and 193b respectively.

These bushings provide for a through-the-housing connection or joint for high voltage power cables. The bushing 193 is best seen in FIG. 19. A pad surface 201 receives the junction pad 31 with the gasket 91b being interposed therebetween. This surface 201 is at one end of the bushing 193. The bushing 193 includes very generally a tubular body 203 having an integral collar 205 at the mounting or junction end of the bushing. This collar 205 provides both a mating surface for the junction pad 31 and a support for the bushing. A mounting base plate 207 holds the bushing 193 and provides a means for securing the bushing to the tank 191. Threaded fasteners, such as bolts 209, fit into threaded openings (not shown) in the tank to secure the mounting plate 207 to the tank. The mounting plate 207 holds the bushing 193 by suitable means, such as a mounting clamp plate 211 which grips the collar 205 securely and is connected to the mounting plate 207 by suitable means (not shown), such as "L" brackets extended from or secured to the mounting clamp plate 211 and bolted or otherwise connected to the mounting base plate 207. In the alternative, the mounting clamp plate 211 could be used to mount the bushing directly to the wall of the tank 191 or any other panel that supports or isolates electrical circuitry or equipment. A suitable gasket 213 is interposed between the collar 205 and the mounting base plate 207 inwardly of the mounting clamp plate 211. The mounting base plate 207 and the mounting clamp plate 211 are preferably metal, although other material may be suitable for the purpose.

The bushing body 203 is preferably of a suitable epoxy resin. In the area of the collar 205 where the mass of material is greater, an annular groove 215 is cast or otherwise formed during the forming of the bushing body, which may be by molding or other process well known by one skilled in the art. Several advantages flow from this groove. For example, it provides better resin integrity from a dielectric point of view, and it provides for the insertion therein of a mounting flange (not shown) that could be used for the mounting of the bushing 193 to the mounting base plate 207. The open side 216 of the groove 215 is adjacent the mounting base plate 207, or the panel in the absence of the plate 207 where the bushing is mounted directly thereon. Should a mounting flange be used, the flange could be affixed in the groove 215 by a suitable epoxy cement to form a hermetic seal.

Near the distal end of the bushing body 203, another groove 217 is provided in the outer periphery of or surface of the bushing body. The outer surfaces of the bushing body are electrically conductive such as by an electrically conductive coating 219. The electrically conductive surface extends continuously from the collar end of the bushing to the groove 217, where it terminates. This electrical conductivity includes the outer peripheral surface of the collar, the surface of the collar adjacent the mounting plate 207 or, in the alternative, the panel or wall of the tank on which it is directly mounted, and all inner surfaces of the groove 215 as well as the outer surface of the tubular body to the groove 217.

This electrical conductive surface 219 provides dielectric shielding on the bushing, which, among other things, eliminates the need to fill the groove 215 in the collar 205 with a dielectric medium to displace any entrapped air in the groove to prevent dielectric breakdown of the air therein. In the illustrated structure, the shielding on the surfaces of the groove reduces the voltage gradients within the groove to levels where any such gradients do not cause dielectric breakdown of the air.

The groove 217 provides dielectric stress relief by terminating the electrically conductive surface or coating in a curve rather than a straight edge. Thus, the equipotential lines of the electric field inwardly of the electrically conductive surface 219 do not form such intense longitudinal voltage gradients in the region adjacent the termination that would breakdown the epoxy resin of the bushing body.

An electrically conductive metal insert 221 fills the generally tubular bushing body 203 and serves as both an electric conductor and connector. The outer diameter of the conductive insert 221 is essentially equal to that of the transverse opening 53 of the junction pad 31 so that the insert slidably fits therein. The insert 221 extends beyond the bushing body 203 at both ends of the body. At the collar end, the insert extends a length substantially equal to the thickness of a wall 223 at the forward or junction pad 31 end of the tubular housing 29 of the connector assembly 28 plus the thickness of the gasket 91b so as to contact the spade 77 when the junction is formed. The other end of the insert extends a sufficient distance beyond the body to provide for an adequate electrical connection with the other electrical circuitry portions, such as the flexible braid conductor 199. The position of the metal insert 221 with respect to the bushing body 203 is maintained by a locking groove 225 provided in the outer periphery of the insert. When the body 203 is formed around the metal insert 221, the epoxy resin material of the body wall will fill this locking groove 225 and secure the relative positions of the two parts. The end of the metal insert 221 extending beyond the collar 205 of the bushing is provided with a threaded bore 227 to receive a spade connection bolt 228. This bolt 228 ensures a good electrical connection between the metal insert 221 and the spade 77 when the junction is made. The other end of the insert is provided with a threaded bore 229 to receive a suitable circuit connection bolt (not shown) such as that used to secure the flexible braid conductor 199 to the metal insert 221.

In making the joint between a high voltage cable and the switch structure 187, each cable end is prepared and structural parts assembled thereon as herein before described. Rather than joining connector assemblies of two such prepared cables, however, each cable is assembled to a bushing 193 by superimposing the junction pad 31 on the bushing pad 201 as described above. The insulator sealing cap 87 with the electrically conductive insert 89 therein and the gasket 91 are applied over the bolt head and junction pad as before. As may be seen in FIG. 18, the joint is completed by covering the insulator sealing cap 87 with a metal clamp 231 to cap the assembly. Clamp bolts 233 threaded into suitable threaded openings (not shown) in the mounting base plate 207, or in the alternative the panel on which the bushing is mounted directly, secure the entire joint. Thus the conductive parts of the joint are completely insulated on the mounting side of the tank or mounting panel. A suitable gasket 235 (FIG. 17) forms a hermetic seal between the mounting base plate 207 and the wall of the tank 191 or other panel.

Thus, there has been described in accordance with the present invention, a universal power cable joint 25 with a connector assembly 28 and a closed-cell sponge stress relief element 69 therefor that (a) encloses the prepared end of a high voltage power cable 27 in an envelope of equal or superior moisture resistant characteristics than that of the cable, (b) provide means to alleviate any increase in voltage stresses on the cable insulation caused by the interruption of the cable shield, (c) provides an accessible voltage test point, (d) is effective for use on a range of cable diameters, (e) is easily and quickly field installed without the separate use of special dielectric compounds or fluid, (f) is easily and quickly modified in the field without significant loss of the labor and parts used in the making of the original junction, and (g) is useful in an insulated high voltage cable termination, such as the connecting of a cable to a high voltage bushing on a switch, other electrical apparatus, or a panel.

Various embodiments of the present invention and modifications thereof other than those shown and described in detail herein will be apparent to those skilled in the art from the foregoing description and are intended to fall within the scope of the accompanying claims in which various features of the invention are set forth.

What is claimed is:

1. A cable joining device comprising:

A. a tubular housing for receiving a prepared end of a power cable having an exposed conductor portion with a terminal applied thereto, an exposed dielectric insulation portion, and an exposed end of a shield layer, a part of said exposed dielectric insulation portion adjacent said exposed end of the shield being a region of high electrical stress, said housing having an open base end and terminating at the opposite end in junction means in communication with the longitudinal passageway of said housing for receiving said terminal of said prepared end, said housing having inner and outer surface portions of an electrically conductive material; and B. an inner stress relief element for interposition between said housing and said prepared end, said element including 1. a first portion comprising a compressible elastomer and having electrically conductive properties, said first portion forming a stress control shield for electical engagement with said shield layer of said cable;

2. a second portion contiguous to said first portion along an interface between said first and second portions for fitting in surrounding relation and in radial compressive stress over said region of said prepared cable end, said second portion having higher dielectric strength than said first portion and comprising a compressible elastomer, said second portion providing dielectric insulation adjacent said first portion, said interface between said first and second portions being directed such that the radial forces in the zone of said element surrounding said region of said prepared cable end intersect parts adjacent one another of both said first and second portions, such intersected parts of said second portion being disposed inwardly of those of said first portion and in surrounding relation to said region to provide dielectric insulation in surrounding engagement with said region, and such intersected parts of said first portion being outwardly adjacent those of said second portion and providing compressibility in the zone of said element surrounding said region for continuous compliance of said element to said cable; and 3. a third portion axially aligned with said other portions and contiguous to said second portion along an interface between said second and said third portions, said interface between said second and said third portions being directed outwardly and away from the first portion end of said element, said third portion being for electrical engagement with said terminal and comprising a compressible elastomer and having electrically conductive properties;

all said portions of said element being under radial compressive stress relative to the axis of said cable when said prepared end is inserted in said tubular housing and said element is interposed therebetween.

2. The cable joining device in accordance with claim 1, wherein said compressible elastomers of said first and third portions of said element are of closed-cell sponge material and said elastomer of said second portion of said element is a closed-cell elastomer having a density that is greater than the density of the elastomers of said first and third portions.

3. The cable joining device in accordance with claim 1, wherein said compressible elastomers of said first and third portions of said element are of closed-cell sponge material and said elastomer of said second portion of said element is a closed-cell elastomer having cells the average size of which is smaller than the average size of the cells of the elastomers of said first and third portions.

4. The cable joining device in accordance with claim 1, wherein said compressible elastomers of said first and third portions of said element are of closed-cell sponge material and said elastomer of said second portion of said element is a solid elastomer.

5. The cable joining device in accordance with claim 1, wherein said portions of said element are distinct and form a composite unit, said composite unit having a generally cylindrical outer surface and an axial bore extending therethrough, the diameter of said bore when said unit is in an uncompressed state being less than the diameter of said exposed dielectric insulation portion of said cable, and the other diameter of said unit being essentially equal to the diameter of at least a portion of said longitudinal passageway of said tubular housing, whereby said unit is placed under radial compressive stress relative to the axis of said cable when said cable joining device is applied in telescopic relation to said prepared end of said cable and said composite unit is interposed therebetween.

6. The cable joining device in accordance with claim 5, wherein: said first portion comprises an opening extending axially therethrough, said first portion opening including a part of said axial bore and a cavity adjoining and axially aligned therewith and increasing outwardly and away therefrom; said second portion comprises a generally frustoconical form, one end of which has an outer surface of a shape complementary to said first portion cavity to interfit therewith, and an opening extending axially therethrough, said second portion opening including a part of said axial bore and a cavity adjoining and axially aligned therewith and increasing outwardly and away therefrom; and said third portion comprises one end having an outer surface of a shape complementary to said second portion cavity to interfit therewith, and a part of said axial bore therein.

7. The cable joining device in accordance with claim 6, wherein said cavity of said first portion terminates its wide end in an arcuate form and at a point inwardly of said generally cylindrical outer surface of said composite unit.

8. The cable joining device in accordance with claim 6, wherein said first portion further comprises an axial counterbore extending inwardly from the non-cavity end thereof, said counterbore having a diameter greater than that of said axial bore and less than that of said exposed end of said cable shield, and wherein said third portion further comprises an axial counterbore extending inwardly from the terminal end thereof, said counterbore having a diameter greater than that of said axial bore and less than that of said terminal.

9. The cable joining device in accordance with claim 1, wherein said electrically conductive properties of each of said first and third portions comprise a conductive coating applied to all surfaces thereof, including the surfaces at said interface between said first and second portions and said interface between said second and third portions.

10. The cable joining device in accordance with claim 1, wherein said electrically conductive properties of each of said first and third portions comprise the insertion of electrically conductive particles throughout the elastomers of said first and third portions.

11. The cable joining device in accordance with claim 1, wherein at least said interface between said first and second portions tapers relative to the cable axis.

12. The cable joining device in accordance with claim 1, further comprising means carried by said tubular housing for testing the voltage of the conductor of said cable.

13. The cable joining device in accordance with claim 12, wherein said voltage testing means comprises an isolated electrically conductive surface on said cable joining device, said isolated surface being insulated from said prepared end of said cable.

14. The cable joining device in accordance with claim 13, wherein said isolated electrically conductive surface is disposed on said tubular housing.

15. The cable joining device in accordance with claim 12, wherein said voltage testing means is disposed on the outer surface of said tubular housing and is rotatable therearound for accessibility.

16. The cable joining device in accordance with claim 1, further comprising a cable entrance housing removably attached to said open base end of said tubular housing, said cable entrance housing including an elastomeric sealing sleeve interconnected therewith for fitting in surrounding relation to the outer surface of said cable.

17. A stress relief element having a generally cylindrical form with an axial bore therethrough and comprising: a first portion comprising a compressible elastomer and having electrically conductive properties, said first portion forming a stress control shield; a second portion in axial alignment with said first portion and contiguous thereto along a tapering interface between said first and second portions, said interface between said first and second portions being directed outwardly and away from the first portion end of said element, and said second portion having higher dielectric strength than said first portion and comprising a compressible elastomer, said second portion providing dielectric insulation adajcent said first portion; and a third portion in axial alignment with said first and second portions and contiguous to said second portion along a tapering interface between said second and third portions, said interface between said second and third portions being directed outwardly and away from said first portion end of said element, said third portion comprising a compressible elastomer and having electrically conductive properties.

18. The stress relief element in accordance with claim 17, wherein said compressible elastomers of said first and third portions of said element are of closed-cell sponge material and said elastomer of said second portion of said element is a closed-cell elastomer having a density that is greater than the density of the elastomers of said first and third portions.

19. The stress relief element in accordance with claim 17, wherein said compressible elastomers of said first and third portions of said element are of closed-cell sponge material and said elastomer of said second portion of said element in a closed-cell elastomer having cells the average size of which is smaller than the average size of the cells of the elastomers of said first and third portions.

20. The stress relief element in accordance with claim 17, wherein said compressible elastomers of said first and third portions of said element are of closed-cell sponge material and said elastomer of said second portion of said element is a solid elastomer.

21. A cable joining device comprising a plurality of connector assemblies, each assembly comprising:
A. a tubular housing for receiving a prepared end of a power cable having an exposed conductor portion, a terminal applied to the exposed conductor portion, an exposed dielectric insulation portion, and an exposed end of a shield layer, a part of said exposed dielectric insulation portion adjacent said exposed end of the shield being a region of high electrical stress, said housing having an open base end and terminating at the opposite end in junction means in communication with the longitudinal passageway of said housing for receiving said terminal of said prepared end, said housing having inner and outer surface portions of an electrically conductive material;
B. an inner stress relief element for interposition between said housing and said prepared end, said element including
 1. a first portion comprising a compressible elastomer and having electrically conductive properties, said first portion forming a stress control shield for electrical engagement with said shield layer of said cable;
 2. a second portion contiguous to said first portion along an interface between said first and second portions for fitting in surrounding relation and in radial compressive stress over said region of said prepared cable end, said second portion having higher dielectric strength than said first portion and comprising a compressible elastomer, said second portion providing dielectric insulation adjacent said first portion, said interface between said first and second portions being directed such that the radial forces in the zone of said element surrounding said region of said prepared cable and intersect parts adjacent one another of both said first and second portions, such intersected parts of said second portion being disposed inwardly of those of said first portion and in surrounding relation to said region to provide dielectric insulation in surrounding engagement with said region, and such intersected parts of said first portion being outwardly adjacent of those of said second portion and providing compressibility in the zone of said element surrounding said region; and
 3. a third portion axially aligned with said other portions and contiguous to said second portion along an interface between said second and said third portions, said interface between said second and said third portions being directed outwardly and away from the first portion end of said element, said third portion being for electrical engagement with said terminal and comprising a compressible elastomer and having electrically conductive properties;
 all said portions of said element being under radial compressive stress relative to the axis of said cable when said prepared end is inserted in said tubular housing and said element is interposed therebetween;
C. an electrically conductive spacer in said junction means interposed between and electrically contacting adjacent terminals of said prepared ends when said junction means of said plurality of connectors are brought together in superimposed and contacting relation to form a joint; and
D. means securing said terminals and interposed spacers in electrically contacting relation in said joint.

22. The cable joining device in accordance with claim 21, wherein said junction means comprises a pad integrally associated with said tubular housing and containing a centrally disposed transverse opening in communication with said longitudinal passageway; wherein said terminal comprises a spade having a central opening therethrough for inserted relation in said transverse opening; wherein said spacer is cylindrical and has an axial opening therethrough; wherein said securing means comprises a bolt and a nut for the bolt, said bolt being disposed in the openings of said spade and interposed spacers and contained within said central transverse openings of said superimposed junction pads; and further comprising means securing and insulating said superimposed junction pads in said joint.

23. A cable joining device comprising:
A. a connector assembly comprising
 1. a tubular housing for receiving a prepared end of a power cable having an exposed conductor portion with a terminal applied thereto, an exposed dielectric insulation portion, and an exposed end of a shield layer, a part of said exposed dielectric insulation portion adjacent said exposed end of the shield being a region of high electrical stress, said housing having an open base end and terminating at the opposite end in junction means in communication with the longitudinal passageway of said housing for receiving said terminal of said prepared end, said housing having inner and outer surface portions of an electrically conductive material;

2. an inner stress relief element for interposition between said housing and said prepared end, said element including
   a. a first portion comprising a compressible elastomer and having electrically conductive properties, said first portion forming a stress control shield for electrical engagement with said shield layer of said cable;
   b. a second portion contiguous to said first portion along an interface between said first and second portions for fitting in surrounding relation and in radial compressive stress over said region of said prepared cable end, said second portion having higher dielectric strength than said first portion and comprising a compressible elastomer, said second portion providing dielectric insulation adjacent said first portion, said interface between said first and second portions being directed such that the radial forces in the zone of said element surrounding said region of said prepared cable end intersect parts adjacent one another of both said first and second portions, such intersected parts of said second portion being disposed inwardly of those of said first portion and in surrounding relation to said region to provide dielectric insulation in surrounding engagement with said region, and such intersected parts of said first portion being outwardly adjacent those of said second portion and providing compressibility in the zone of said element surrounding said region for continuous compliance of said element to said cable; and
   c. a third portion axially aligned with said other portions and contiguous to said second portion along an interface between said second and said third portions, said interface between said second and said third portions being directed outwardly and away from the first portion end of said element, said third portion being for electrical engagement with said terminal and comprising a compressible elastomer and having electrically conductive properties;
   all said portions of said element being under radial compressive stress relative to the axis of said cable when said prepared end is inserted in said tubular housing and said element is interposed therebetween;
B. a bushing receiving said connector assembly for mounting said assembly on a panel, said bushing having an electrically conductive insert contacting said terminal of said cable when said assembly is so received.

24. The cable joining device in accordance with claim 23 and mounted on a panel, wherein said bushing extends through an opening in the panel and said insert extends longitudinally through said bushing engaging electrical circuitry on the non-connector assembly side of the panel.

25. The cable joining device in accordance with claim 23, wherein said bushing comprises: a generally tubular form having a stress relief groove in the outer surface near one end of said bushing; a collar integral with and disposed at the other end of said bushing; an annular groove in the face of said collar nearest said stress relief groove, said annular groove opening toward said stress relief groove; and an electrically conductive outer surface on said bushing continuously extending along the peripheral surface thereof to said stress relief groove and including the peripheral surface and the face of said collar having said annular groove therein and all inner surfaces of said annular groove.

* * * * *

UNITED STATES PATENT OFFICE
CERTIFICATE OF CORRECTION

Patent No. 3,800,064              Dated March 26, 1974

Inventor(s) George E. Lusk

It is certified that error appears in the above-identified patent and that said Letters Patent are hereby corrected as shown below:

Column 1, line 10, "aplied" should read -- applied --.

line 21, "rate" should read -- rating --.

line 28, after "shield" first occurrence, insert -- layer to enhance the current carrying capacity of the shield --.

Column 2, line 53, after "element" insert -- size --.

Column 4, line 46, "the" should read -- The --.

Column 5, line 22, "bar" should read -- bare --.

Column 6, line 27, "pad" should read -- pads --.

line 42, after "washer" insert -- 101 --.

Column 7, line 3, "connection" should read -- connector --.

line 44, "generally" should read -- general --.

Column 8, line 62, "The" should read -- A --.

Column 9, line 30, after "be" insert -- a --.

line 54, "in" should read -- it --.

line 56, after "be" insert -- a --.

CONTINUED

UNITED STATES PATENT OFFICE
CERTIFICATE OF CORRECTION

Patent No. 3,800,064  Dated March 26, 1974

Inventor(s) George E. Lusk

It is certified that error appears in the above-identified patent and that said Letters Patent are hereby corrected as shown below:

Page 2

Column 10, line 58, "of" second occurrence should read -- or --.

Column 14, line 28, "th" should read -- the --.

Claim 5, Column 19, line 46, "other" should read -- outer --.

Claim 19, Column 21, line 23, "in" should read -- is --.

Signed and sealed this 15th day of October 1974.

(SEAL)
Attest:

McCOY M. GIBSON JR.  C. MARSHALL DANN
Attesting Officer  Commissioner of Patents